US 11,118,670 B2

(12) United States Patent
Yashiro et al.

(10) Patent No.: US 11,118,670 B2
(45) Date of Patent: Sep. 14, 2021

(54) VEHICLE COOLING SYSTEM

(71) Applicant: TOYOTA JIDOSHA KABUSHIKI KAISHA, Toyota (JP)

(72) Inventors: Takahisa Yashiro, Nagoya (JP); Yoshitada Yamagishi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 16/775,355

(22) Filed: Jan. 29, 2020

(65) Prior Publication Data

US 2020/0240512 A1  Jul. 30, 2020

(30) Foreign Application Priority Data

Jan. 30, 2019  (JP) .............................. JP2019-014904

(51) Int. Cl.
*H02K 9/19* (2006.01)
*F16H 57/04* (2010.01)
(Continued)

(52) U.S. Cl.
CPC .......... *F16H 57/0476* (2013.01); *B60K 1/00* (2013.01); *B60K 17/16* (2013.01); *F01M 1/02* (2013.01); *F01M 1/16* (2013.01); *F01M 1/18* (2013.01); *F01M 11/10* (2013.01); *F16H 57/037* (2013.01); *F16H 57/0436* (2013.01); *F16H 57/0483* (2013.01); *F16N 7/38* (2013.01); *F16N 29/02* (2013.01); *H02K 7/116* (2013.01); *H02K 9/19* (2013.01); *B60K 2001/001* (2013.01);
(Continued)

(58) Field of Classification Search
CPC ............... F16H 57/037; F16H 57/0436; F16H 2057/02052; H02K 9/19
See application file for complete search history.

(56) References Cited

U.S. PATENT DOCUMENTS

2013/0078111 A1  3/2013  Okamoto
2013/0238147 A1* 9/2013  Okamoto ................ F04B 51/00
                                                    700/282
(Continued)

FOREIGN PATENT DOCUMENTS

JP  2012-067823 A  4/2012
JP  2013-068267 A  4/2013
JP  2017-150367 A  8/2017

*Primary Examiner* — Huan Le
(74) *Attorney, Agent, or Firm* — Oblon, McClelland, Maier & Neustadt, L.L.P.

(57) ABSTRACT

A vehicle cooling system comprises an oil circulation circuit in which a cooling oil is circulated by an electric oil pump to cool a predetermined cooling target with the cooling oil; an oil temperature sensor detecting an oil temperature that is a temperature of the cooling oil; and a control device including a cooling control portion outputting a rotation command for operating the electric oil pump so as to cool the cooling target. The control device includes a pump abnormality determination portion outputting the rotation command to the electric oil pump to determine a presence/absence of abnormality based on a rotation state of the electric oil pump when an operation stop time of the vehicle is longer than a predefined determination permission time and an oil temperature detection value detected by the oil temperature sensor is higher than a predefined determination permission temperature.

12 Claims, 6 Drawing Sheets

(51) Int. Cl.

| | |
|---|---|
| *F16N 7/38* | (2006.01) |
| *F01M 1/02* | (2006.01) |
| *F16N 29/02* | (2006.01) |
| *F01M 1/16* | (2006.01) |
| *F01M 1/18* | (2006.01) |
| *F01M 11/10* | (2006.01) |
| *B60K 1/00* | (2006.01) |
| *F16H 57/037* | (2012.01) |
| *H02K 7/116* | (2006.01) |
| *B60K 17/16* | (2006.01) |
| *F16H 57/02* | (2012.01) |

(52) U.S. Cl.
CPC . *F01M 2001/0253* (2013.01); *F01M 2250/60* (2013.01); *F16H 2057/02052* (2013.01); *F16N 2200/10* (2013.01); *F16N 2210/04* (2013.01); *F16N 2250/08* (2013.01); *F16N 2270/70* (2013.01)

(56) References Cited

U.S. PATENT DOCUMENTS

2013/0323095 A1* 12/2013 Tazume ............... F04B 49/065
                                                   417/364
2015/0184577 A1*  7/2015 Suzuki ............... F04D 15/0088
                                                   417/44.1

* cited by examiner

VEHICLE COOLING SYSTEM

This application claims priority from Japanese Patent Application No. 2019-014904 filed on Jan. 30, 2019, the disclosure of which is herein incorporated by reference in its entirety.

FIELD OF THE INVENTION

The present invention relates to a vehicle cooling system and, more particularly, to a vehicle cooling system properly determining an abnormality of an electric oil pump circulating a cooling oil.

DESCRIPTION OF THE RELATED ART

A known vehicle cooling system includes (a) an oil circulation circuit in which a cooling oil is circulated by an electric oil pump to cool a predetermined cooling target with the cooling oil, (b) an oil temperature sensor detecting an oil temperature that is a temperature of the cooling oil, and (c) a control device including a cooling control portion outputting a rotation command for operating the electric oil pump so as to cool the cooling target (see Patent Document 1). Patent Document 2 describes a technique of determining an electric oil pump as being abnormal when a rotation speed of the electric oil pump is equal to or less than a predetermined value and an oil temperature is equal to or greater than a predetermined value. Specifically, in the case of relatively low oil temperature, relatively high viscosity of the cooling oil increases a rotation resistance of the electric oil pump, so that the oil pump is not determined as being abnormal even if the rotation speed is relatively low, while the oil pump is determined as being abnormal when the rotation speed is equal to or less than the predetermined value during relatively high oil temperature when the rotation resistance is relatively small.

PRIOR ART DOCUMENTS

Patent Documents

Patent Document 1: Japanese Laid-Open Patent Publication No. 2012-67823
Patent Document 2: Japanese Laid-Open Patent Publication No. 2017-150367

SUMMARY OF THE INVENTION

Technical Problem

In the case of the technique of patent document 2 applied to the vehicle cooling system, for example, it is conceivable that the electric oil pump is determined as being abnormal when the cooling control portion outputs the rotation command to the electric oil pump on condition that an oil temperature detection value detected by an oil temperature sensor is higher than a predefined operation allowable temperature but the electric oil pump does not properly rotate. However, for example, if the oil temperature sensor is disposed near the cooling target and thermally affected by the cooling target while an oil suction part of the electric oil pump is away from the cooling target and a long stop time of the electric oil pump prolongs a stagnation time of the cooling oil, a difference increases between the oil temperature at the oil suction part of the electric oil pump and the oil temperature detected by the oil temperature sensor, so that the rotation command may be output to the electric oil pump regardless of a low oil temperature at the oil suction part, and an abnormality determination may erroneously be made due to rotation abnormality of the electric oil pump.

The present invention was conceived in view of the situations and it is therefore an object of the present invention to prevent an abnormality determination from being erroneously made due to rotation abnormality of an electric oil pump when a difference may occur between an oil temperature detection value from an oil temperature sensor and an oil temperature at an oil suction part of the electric oil pump.

Solution to Problem

To achieve the above object, a first aspect of the present invention provides a vehicle cooling system comprising: (a) an oil circulation circuit in which a cooling oil is circulated by an electric oil pump to cool a predetermined cooling target with the cooling oil; (b) an oil temperature sensor detecting an oil temperature that is a temperature of the cooling oil; and (c) a control device including a cooling control portion outputting a rotation command for operating the electric oil pump so as to cool the cooling target, wherein (d) the control device includes a pump abnormality determination portion outputting the rotation command to the electric oil pump to determine a presence/absence of abnormality based on a rotation state of the electric oil pump when an operation stop time of the vehicle is longer than a predefined determination permission time and an oil temperature detection value detected by the oil temperature sensor is higher than a predefined determination permission temperature.

A second aspect of the present invention provides the vehicle cooling system recited in the first aspect of the invention, wherein (a) the cooling control portion makes a provisional abnormality determination in case of rotation abnormality of the electric oil pump when the rotation command is output to the electric oil pump, and wherein (b) the pump abnormality determination portion performs a process of determining the presence/absence of abnormality when the provisional abnormality determination is made by the cooling control portion.

A third aspect of the present invention provides the vehicle cooling system recited in the first or second aspect of the invention, wherein the cooling control portion outputs the rotation command to the electric oil pump when the oil temperature detection value is higher than a predefined operation allowable temperature.

A fourth aspect of the present invention provides the vehicle cooling system recited in the first or second aspect of the invention, wherein (a) the cooling target is a rotating machine, wherein (b) the oil temperature sensor is disposed closer to the rotating machine than an oil suction part of the electric oil pump, wherein (c) the vehicle cooling system includes a rotating-machine temperature sensor detecting a rotating-machine temperature that is a temperature of the rotating machine, wherein (d) the cooling control portion outputs the rotation command to the electric oil pump when a predefined cooling request condition is affirmed and the oil temperature detection value is higher than a predefined operation allowable temperature, and wherein (e) the cooling request condition is affirmed when at least one of a rotating-machine temperature detection value detected by the rotating-machine temperature sensor and the oil temperature detection value is higher than a predefined cooling-required temperature.

The rotating machine may be an electric motor, a generator or a motor generator providing both functions of the electric motor and the generator.

A fifth aspect of the present invention provides the vehicle cooling system recited in any one of the first to fourth aspects of the invention, wherein (a) the cooling target is an electric motor used as a drive force source for running, wherein (b) an electric drive unit is configured to include the electric motor, a transaxle transmitting an output of the electric motor via a differential device to left and right wheels, and a casing housing the electric motor and the transaxle, wherein (c) the casing includes a motor chamber housing the electric motor and a gear chamber housing the transaxle, wherein (d) the electric oil pump sucks the cooling oil returned to an oil sump disposed in the gear chamber to supply the cooling oil through an oil cooler to the electric motor in the motor chamber, and wherein (e) the oil temperature sensor is disposed on the motor chamber side.

Advantageous Effects of Invention

In such a vehicle cooling system, since the rotation command is output to the electric oil pump to determine the presence/absence of abnormality based on the rotation state thereof when the operation stop time of the vehicle is longer than the predefined determination permission time and an oil temperature detection value detected by the oil temperature sensor is higher than the predefined determination permission temperature, the abnormality determination of the electric oil pump can be performed with high accuracy. Specifically, for example, if the oil temperature sensor has an oil temperature detection position close to the cooling target and is thermally affected by the cooling target, and a long stop time of the electric oil pump prolongs a stagnation time of the cooling oil, the difference may increase between the oil temperature at the oil suction part of the electric oil pump and the oil temperature detection value from the oil temperature sensor. Even in this case, the difference therebetween is reduced by heat dissipation, etc., as the operation stop time of the vehicle elapses, and therefore, the erroneous abnormality determination attributable to the difference between the oil temperature at the oil suction part and the oil temperature detection value can be prevented by appropriately setting the determination permission time. As compared to when a dedicated temperature sensor is separately disposed in the oil suction part of the electric oil pump, the accuracy and reliability of abnormality determination can easily and inexpensively be improved without increasing the number of parts.

In the second aspect of the invention, a provisional abnormality determination is made in case of rotation abnormality of the electric oil pump for example where the electric oil pump cannot rotate, when the rotation command is output to the electric oil pump by the cooling control portion, and if the provisional abnormality determination is made, the pump abnormality determination portion performs the process of determining the presence/absence of abnormality. This reduces the frequency of execution of the abnormality determination process by the pump abnormality determination portion, so that deterioration in NV (Noise, Vibration) and electric power consumption due to rotation of the electric oil pump is suppressed.

In the third aspect of the invention, the cooling control portion outputs the rotation command to the electric oil pump when the oil temperature detection value is higher than the predefined operation allowable temperature, and therefore, when the difference between the oil temperature at the oil suction part and the oil temperature detection value is relatively small, the oil temperature at the oil suction part is higher than the operation allowable temperature so that the electric oil pump is properly operated. In the second aspect of the invention, the frequency of the provisional abnormality determination is reduced, and thus the frequency of execution of the abnormality determination process by the pump abnormality determination portion is further reduced, so that the deterioration in NV and electric power consumption is further properly suppressed.

The cooling target in the fourth aspect of the invention is the rotating machine, which generates heat when the rotating machine functions as an electric motor or a generator, and therefore needs to be supplied and cooled with the cooling oil by the electric oil pump. In this case, the oil temperature sensor is disposed closer to the rotating machine than to the oil suction part of the electric oil pump, and the cooling request condition is affirmed when at least one of the oil temperature detection value detected by the oil temperature sensor and the rotating machine temperature detection value detected by the rotating machine temperature sensor is higher than the predefined cooling-required temperature and the rotation command is output to the electric oil pump, so that the rotating machine can properly be cooled.

Moreover, in the fourth aspect of the invention, when the oil temperature detection value of the oil temperature sensor is higher than the predefined operation allowable temperature, the cooling control portion outputs the rotation command to the electric oil pump, and therefore, when the difference between the oil temperature at the oil suction part and the oil temperature detection value is relatively small, the oil temperature at the oil suction part is higher than the operation allowable temperature, and the electric oil pump is properly operated. However, since the oil temperature sensor is disposed near the rotating machine, if a long stop time of the electric oil pump prolongs a stagnation time of the cooling oil, the oil temperature detection value of the oil temperature sensor becomes higher due to a thermal effect of radiant heat etc. of the rotating machine, and the difference between the oil temperature detection value and the oil temperature at the oil suction part of the electric oil pump may increase. Therefore, a remarkable effect is obtained in terms of preventing the erroneous abnormality determination attributable to the difference between the oil temperature at the oil suction part and the oil temperature detection value by outputting the rotation command to the electric oil pump to perform the abnormality determination process on condition that the operation stop time of the vehicle is longer than the predefined determination permission time and the oil temperature detection value is higher than the predefined determination permission temperature.

In the case of the fifth aspect of the invention, the cooling target is the electric motor used as the drive force source for running; the electric drive unit is configured to include the electric motor, the transaxle, and the casing; the casing includes the motor chamber and the gear chamber; the electric oil pump sucks the cooling oil returned to the oil sump disposed in the gear chamber to supply the cooling oil through the oil cooler to the electric motor in the motor chamber; and the oil temperature sensor is disposed in the motor chamber. In this case, if a long stop time of the electric oil pump prolongs a stagnation time of the cooling oil, the oil temperature detection value of the oil temperature sensor becomes higher due to a thermal effect of radiant heat etc. of the electric motor, while the oil temperature of the oil sump defined as the oil suction part of the electric oil pump is reduced by an ambient temperature, so that the difference therebetween may become larger. Therefore, a remarkable effect is obtained in terms of preventing an erroneous abnormality determination attributable to the difference between the oil temperature at the oil suction part and the oil temperature detection value by outputting the rotation command to the electric oil pump to perform an abnormality determination process on condition that the operation stop time of the vehicle is longer than the predefined determination permission time and the oil temperature detection value from the oil temperature sensor is higher than the predefined determination permission temperature.

MODES FOR CARRYING OUT THE INVENTION

Figure 1:
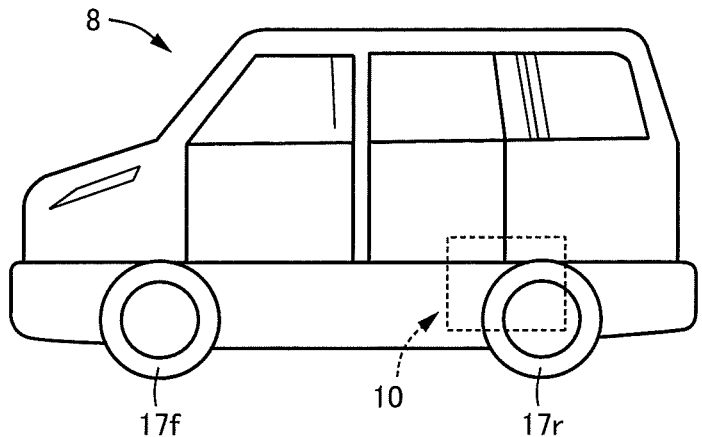
FIG. 1 is a schematic left side view of an electric vehicle including a cooling system that is an example of the present invention as viewed from the left side.

The present invention is applied to, for example, an electric vehicle including the electric motor as the drive force source for running and may be applied to an engine-drive vehicle having only an engine (internal combustion engine) as a drive force source. The electric motor may be a motor generator also functioning as a generator. The electric vehicle is an electric vehicle having only an electric motor as a drive force source, or a parallel or series hybrid vehicle including an electric motor and an engine as drive force sources. The electric vehicle may use only a vehicle-mounted battery as a power source for running or may be equipped with an electric power generating device such as a fuel cell.

An oil circulation circuit may be a closed circuit allowing a cooling oil to flow and circulate through an oil passage and piping disposed in a casing, a cooling target, etc., or may be a circuit in which the cooling oil discharged from a piping etc. is scattered to the cooling target and allowed to flow down and is then returned to an oil sump etc. Examples of the cooling target include various members and components generating heat including a drive force source such as an electric motor and an engine, a power control unit such as a generator and an inverter, a power transmission mechanism such as a gear and a belt, a friction element, and a bearing. For the cooling oil, for example, a lubricating oil such as ATF (automatic transmission fluid) is suitably used. An oil temperature sensor is desirably in contact with the cooling oil to detect an oil temperature or may detect a temperature of a piping etc. through which the cooling oil flows since an error is allowed to some extent.

An operation stop time of the vehicle is a time when a difference decreases between an oil temperature at an oil suction part of an electric oil pump and an oil temperature detection value due to heat dissipation, etc. of the cooling target and the cooling oil, is a time when at least an operation of the cooling target of the cooling system is stopped, and is an OFF time of a power switch enabling running of the vehicle, for example. An abnormality determination process by a pump abnormality determination portion is desirably performed, for example, during stop immediately after start of operation of the vehicle when an ON operation of the power switch is performed, from the viewpoint of making a determination while the difference between the oil temperature at the oil suction part and the oil temperature detection value is relatively small; however, to suppress a sense of strangeness due to the rotation of the electric oil pump, the abnormality determination process may be performed after the vehicle starts running. A determination permission time is a time in which the pump abnormality determination portion can perform the abnormality determination process, is a time required for the difference between the oil temperature at the oil suction part and the oil temperature detection value to decrease to a level at which an abnormality can properly be determined due to heat dissipation of the cooling target and the cooling oil, etc., and is appropriately determined in advance by experiments etc. Various names such as a start & stop switch and an IG switch are used for the power switch. An OFF time of the power switch is a time when a main power supply of the vehicle including a drive system is shut off.

For example, a cooling control portion is configured to make a provisional abnormality determination when a rotation command is output to an electric oil pump and rotation abnormality of the electric oil pump occurs, and the pump abnormality determination portion is configured to perform the process of determining the presence/absence of abnormality when the provisional abnormality determination is made by the cooling control portion; however, the cooling control portion may not necessarily make a provisional abnormality determination, and the pump abnormality determination portion may perform the abnormality determination process regardless of the provisional abnormality determination. The provisional abnormality determination of the electric oil pump may be made, for example, when a rotation determination value lower than a normal rotation speed is not reached in addition to when rotation of the electric oil pump is impossible (rotation speed of the electric oil pump≈0). The cooling control portion desirably outputs the rotation command to the electric oil pump when the oil temperature detection value is higher than the predefined operation allowable temperature; however, the cooling control portion may output the rotation command to the electric oil pump regardless of the operation allowable temperature.

When the cooling target is a rotating machine such as an electric motor, the cooling system is provided with a rotating-machine temperature sensor detecting a rotating-machine temperature that is a temperature of the rotating machine, and the cooling control portion is configured to output a rotation command to the electric oil pump when, for example, at least one of a rotating-machine temperature detection sensor value detected by the rotating-machine temperature detection sensor and the oil temperature detection value is higher than a cooling-required temperature; however, the rotating-machine temperature may be determined only from the rotating-machine temperature detection value so as to output the rotation command to the electric oil pump. Alternatively, the rotating-machine temperature sensor may not be included so that the rotation command is output to the electric oil pump based on an operation state (such as motor torque) of the rotating machine, or other various forms are available. For a cooling target other than the rotating machine, the necessity for cooling may be determined by using a temperature sensor detecting the temperature thereof.

In the case of an electric vehicle including an electric drive unit having an electric motor, a transaxle, and a casing, for example, the electric motor is the cooling target, and the oil temperature sensor is disposed on the motor chamber side on which the electric motor is housed, while the electric oil pump is disposed on the gear chamber side on which an oil sump is disposed; however, the transaxle may be the cooling target, and the oil sump may be disposed on the motor chamber side, or other various fauns are available. The "motor chamber side" means a portion on the motor chamber side of the electric drive unit in which the motor chamber is placed adjacent to the gear chamber, and includes inside the motor chamber. The same applies to "gear chamber side". The arrangement positions of the oil temperature sensor and the electric oil pump are also determined as appropriate. The present invention is not limited to a transaxle and is applicable to vehicles having various drive systems such as a rear-wheel drive vehicle of a front-mounted drive force source type (so-called FR vehicle) and a front and rear wheel drive vehicle.

An example of the present invention will now be described in detail with reference to the drawings. In the following example, the figures are simplified or deformed as needed and portions are not necessarily precisely drawn in terms of dimension ratio, shape, etc.

Figure 2:
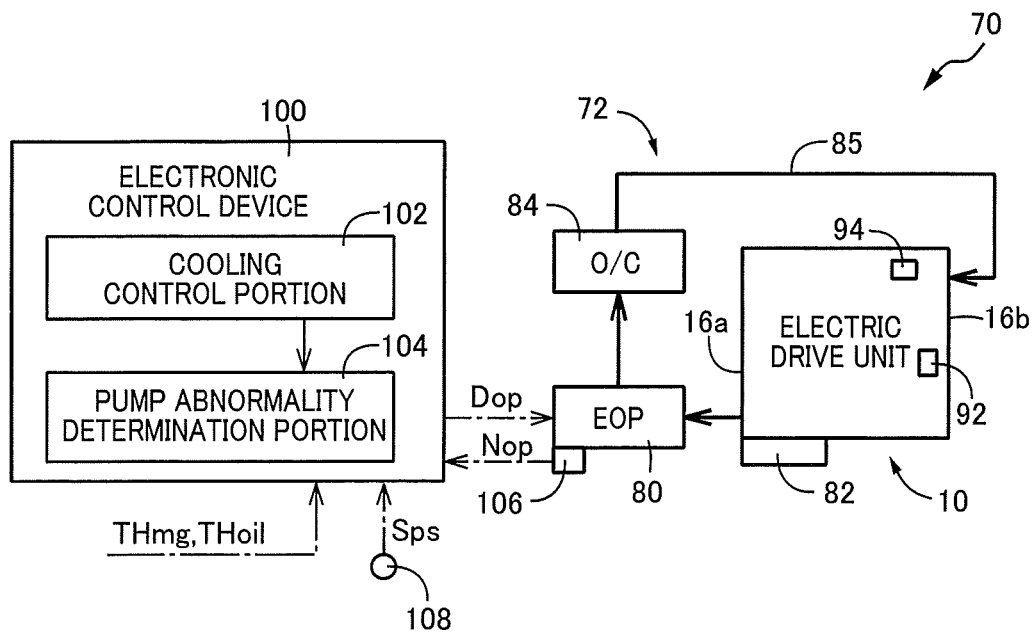
FIG. 2 is a block diagram for explaining the cooling system disposed on an electric drive unit of the electric vehicle of FIG. 1.
Figure 3:
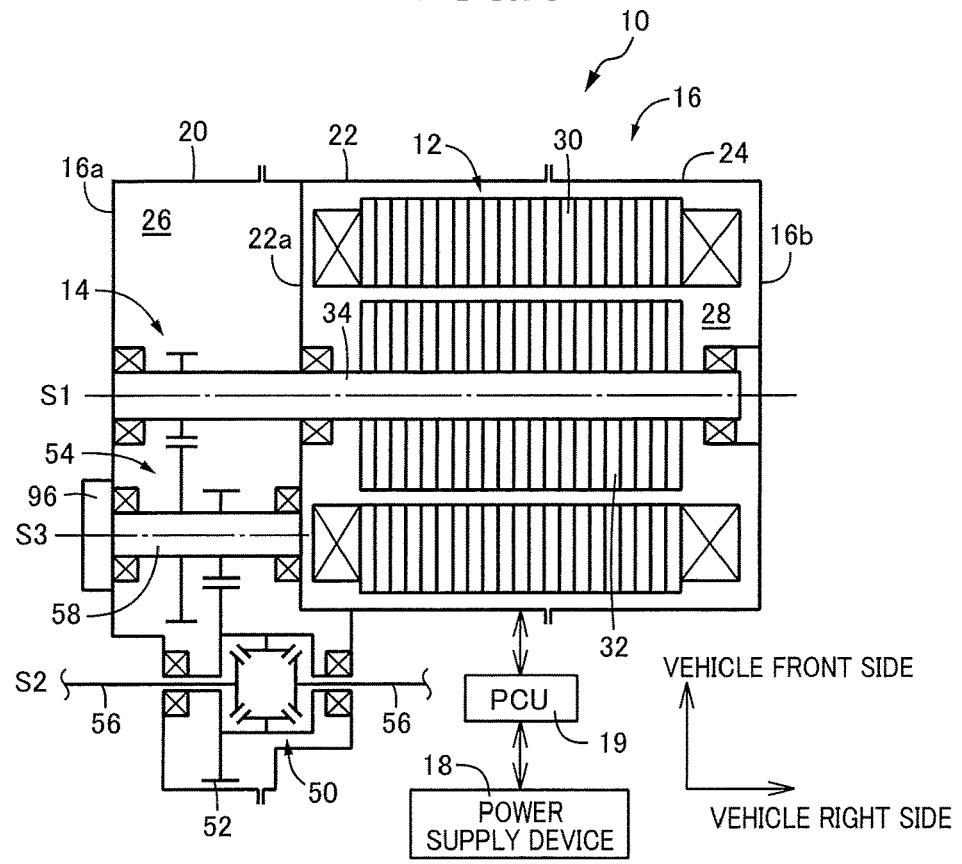
FIG. 3 is a diagram for explaining a schematic configuration of the electric drive unit mounted on the electric vehicle of FIG. 1 and is a cross-sectional view taken along a horizontal cut plane and showing multiple axes developed and arranged in one plane.
Figure 4:
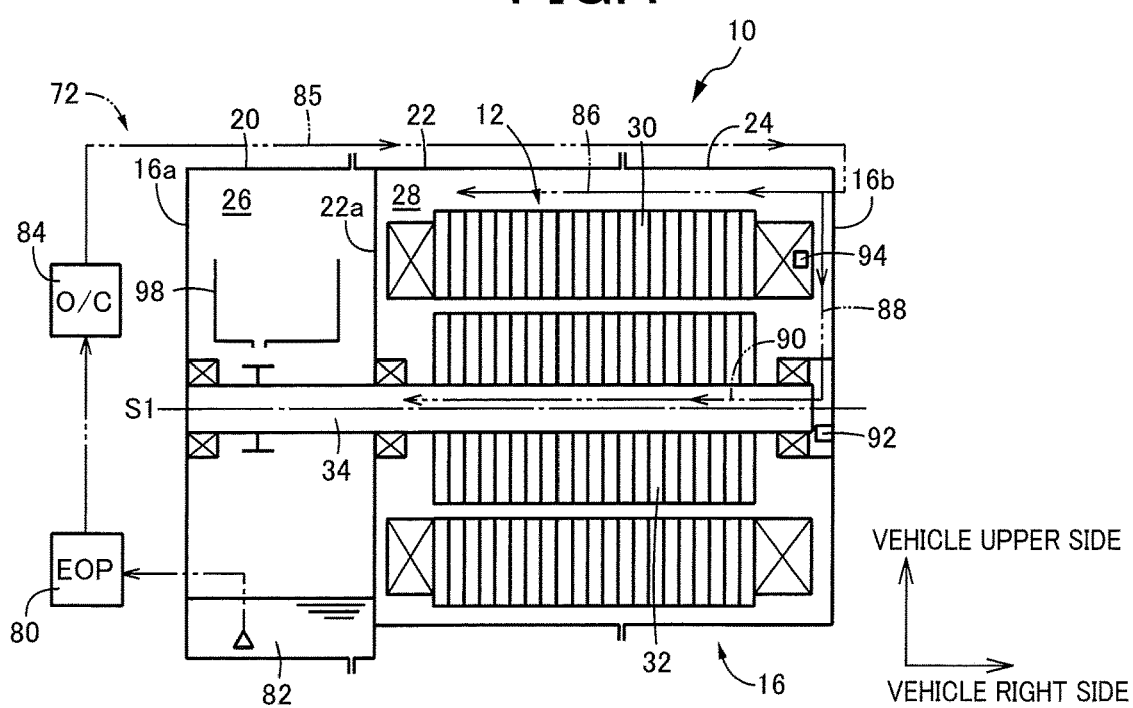
FIG. 4 is a cross-sectional view obtained by cutting the electric drive unit of FIG. 3 in a vertical direction to include a first axis S1.

FIG. 1 is a schematic left side view of an electric vehicle 8 including a cooling system 70 that is an example of the present invention as viewed from the left side, and FIG. 2 is a block diagram for explaining the cooling system 70 disposed on an electric drive unit 10 of the electric vehicle 8 of FIG. 1. FIG. 3 is a diagram for explaining a schematic configuration of the electric drive unit 10 and is a cross-sectional view obtained by cutting in a substantially horizontal direction, and FIG. 4 is a cross-sectional view obtained by cutting the electric drive unit 10 in a vertical direction to include a first axis S1. The electric drive unit 10 includes an electric motor 12 disposed on a first axis S1 and used as a drive force source for running, a transaxle 14 adjacently disposed on one end side of the electric motor 12 side by side in a direction parallel to the first axis S1, and a casing 16 housing the electric motor 12 and the transaxle 14. The electric drive unit 10 is a transversely-mounted unit mounted on the electric vehicle 8 in such a posture that the first axis S1 is parallel to a vehicle width direction and is disposed in a rear portion of the electric vehicle 8 to rotationally drive rear wheels 17r. Therefore, the electric vehicle 8 of this example is a rear-wheel drive vehicle of a rear-mounted drive force source type in which the electric drive unit 10 is disposed in the rear portion of the vehicle to rotationally drive the rear wheels 17r for running. The electric drive unit 10 of this example can be applied to a front-wheel drive vehicle of a front-mounted drive force source type in which the electric drive unit 10 is disposed in a front portion of the electric vehicle 8 to rotationally drive left and right front wheels 17f for running.

The electric vehicle 8 is an electric vehicle including only a single electric motor 12 as a drive force source, and a predetermined high voltage electric power is supplied from a power supply device 18 through a power control unit (PCU) 19 such as an inverter to the electric motor 12. The electric motor 12 is a rotating machine, concretely, a motor generator selectively functioning as an electric motor and a generator in this example. For example, a fuel cell is employed as the power supply device 18; however, a battery may be used, or a generator rotationally driven by an engine as in a series hybrid vehicle may also be used.

The casing 16 includes a bottomed cylindrical gear casing portion 20, a cylindrical first motor casing portion 22, and a bottomed cylindrical second motor casing portion 24. The first motor casing portion 22 is integrally provided with a partition wall 22a extending to the inner circumferential side, and one opening portion of the first motor casing portion 22 is integrally coupled to an opening portion of the gear casing portion 20 by a bolt etc. so that a gear chamber 26 is formed between the gear casing portion 20 and the partition wall 22a, and the transaxle 14 is housed in the gear chamber 26. The transaxle 14 corresponds to a power transmission mechanism transmitting an output of the electric motor 12 to the rear wheels 17r.

An opening portion of the second motor casing portion 24 is integrally coupled to the other opening portion of the first motor casing portion 22 by bolts etc., and a motor chamber 28 housing the electric motor 12 is formed inside. The electric motor 12 is a synchronous motor and includes a stator 30 and a rotor 32 having an annular shape concentric with the first axis S1, and the rotor 32 has a diameter smaller than the stator 30 and is disposed inside the stator 30 with a motor shaft 34 disposed in a central portion. The motor shaft 34 is made up of multiple members coupled by splines etc. as necessary. The stator 30 is integrally fixed to the partition wall 22a of the first motor casing portion 22 by multiple bolts not shown, while the motor shaft 34 is supported rotatably around an axis coincident with the first axis S1 by the casing 16 via multiple bearings. The first axis S1 corresponds to a rotating machine center line that is a center line of the electric motor 12, and the motor shaft 34 corresponds to an output shaft.

The transaxle 14 includes a differential device 50 disposed on a second axis S2 parallel to the first axis S1, and a gear type speed reducing mechanism 54 transmitting power between the motor shaft 34 of the electric motor 12 and a ring gear 52 of the differential device 50. The gear type speed reducing mechanism 54 is a parallel shaft type gear mechanism reducing a speed of rotation of the motor shaft 34 and transmitting the rotation to the differential device 50 and includes a reduction gear shaft 58 provided with a reduction large gear and a reduction small gear. The reduction gear shaft 58 is disposed on a third axis S3 parallel to the first axis S1 and the second axis S2. The differential device 50 is a bevel gear type differential mechanism and transmits the power transmitted to the ring gear 52, from a pair of side gears to a pair of left and right drive shafts 56. As a result, the left and right rear wheels 17r are rotationally driven.

The electric drive unit 10 as described above includes the cooling system 70 shown in FIG. 2. The cooling system 70 includes an oil circulation circuit 72 indicated by a thick solid line arrow of FIG. 2. The oil circulation circuit 72 is a circuit for cooling a cooling target, i.e., the electric motor 12 etc., and lubricating bearings etc. with a cooling oil such as ATF circulated by an electric oil pump (EOP) 80. The electric oil pump 80 is disposed in an outside portion of a left side surface 16a of the casing 16, i.e., outside the gear chamber 26, in the direction parallel to the first axis S1, and sucks the cooling oil returned to an oil sump 82 disposed on a bottom portion of the gear chamber 26 to supply the cooling oil from an oil cooler (O/C) 84 through an external piping 85 toward a right side surface 16b of the casing 16. The cooling oil supplied toward the right side surface 16b is introduced into an upper portion of the motor chamber 28 from the right side surface 16b and supplied in a divided manner to a first internal piping 86 disposed in an upper part of the electric motor 12 and an oil passage 88 disposed in the second motor casing portion 24 as shown in FIG. 4. The oil cooler 84 is a heat exchanger etc. cooling the cooling oil through heat exchange, and an electric or mechanical cooling fan etc. can be disposed as necessary. The cooling oil may be cooled by using a cooling medium such as a coolant. The oil sump 82 corresponds to an oil suction part of the electric oil pump 80.

The first internal piping 86 is provided with multiple discharge holes opened downward, and the cooling oil discharged downward from the discharge holes flows down onto the stator 30 to cool the stator 30. The oil passage 88 provided in the second motor casing portion 24 extends to the inner circumferential side in a radial direction of the electric motor 12 and has an end portion on the inner circumferential side reaching the first axis S1. The motor shaft 34 forms a hollow shape (cylindrical shape) and is provided with a second internal piping 90 on the first axis S1, and the oil passage 88 is allowed to communicate with the second internal piping 90. The second internal piping 90 is provided with multiple discharge holes penetrating in the radial direction, and the cooling oil discharged from the discharge holes is allowed to flow out through radial holes disposed in the motor shaft 34 to the outer circumferential side, or allowed to flow out from an axial end portion of the motor shaft 34, and is supplied to the rotor 32, the bearings, etc. for cooling and lubrication.

As described above, the cooling oil supplied to the stator 30, the rotor 32, the bearings, etc. of the electric motor 12 is allowed to flow downward and flow into the gear chamber 26 from a communication hole (not shown) disposed in the partition wall 22a and is returned to the oil sump 82 in a lower portion of the gear chamber 26. An oil temperature sensor 92 detecting an oil temperature, i.e., the temperature of the cooling oil, is disposed near the above-described end portion of the oil passage 88, i.e., in the vicinity of the first axis S 1, and a motor temperature sensor 94 detecting a motor temperature, i.e., the temperature of the electric motor 12, is disposed on an coil end outer circumferential portion of the electric motor 12. Signals indicative of an oil temperature detection value THoil detected by the oil temperature sensor 92 and a motor temperature detection value THmg detected by the motor temperature sensor 94 are each supplied to an electronic control device 100 controlling the electric oil pump 80. The motor temperature sensor 94 corresponds to a rotating-machine temperature sensor, and the motor temperature detection value THmg corresponds to a rotating-machine temperature detection value.

A mechanical oil pump 96 rotationally driven by the reduction gear shaft 58 is disposed on the left side surface 16a of the casing 16 concentrically with the third axis S3 on which the reduction gear shaft 58 is disposed. The mechanical oil pump 96 supplies the cooling oil to lubricate a gear meshing portion and bearings of the transaxle 14 disposed in the gear chamber 26 and sucks the cooling oil from the oil sump 82 to supply the cooling oil to portions in the gear chamber 26 through an oil passage (not shown) disposed in the gear casing portion 20. A portion of the cooling oil is temporarily stored in an oil storage 98 disposed in an upper portion of the gear chamber 26 and gradually allowed to flow down from an opening disposed in a bottom portion of the oil storage 98 so that gears and bearings are lubricated even during stop of the vehicle 8 or at a lower vehicle speed. The cooling oil supplied from the mechanical oil pump 96 to the portions in the gear chamber 26 is also returned to the oil sump 82 disposed in the lower portion of the gear chamber 26 after lubricating the gears and bearings. A portion of the cooling oil in the oil sump 82 is scooped up by the ring gear 52 of the differential device 50, for example, and used for lubrication of gears etc.

The electronic control device 100 is configured to include a so-called microcomputer including a CPU, a RAM, a ROM, and an I/O interface, etc., and the CPU executes signal processes in accordance with a program stored in advance in the ROM, while utilizing a temporary storage function of the RAM, to control the operating state of the electric oil pump 80 and determine the presence/absence of abnormality. The electronic control device 100 is supplied with signals related to the oil temperature detection value THoil, the motor temperature detection value THmg, a signal related to an EOP rotation speed Nop that is the rotation speed of the electric oil pump 80 from an EOP rotation speed sensor 106, and a power switch (PS) operation signal Sps from a power switch 108 disposed near a driver's seat of the electric vehicle 8. The power switch 108 is an automatic-reset type push-button switch in this example, and is operated by pressing to switch, an electric power supply state among states such as IGON at which the electric vehicle 8 can run depending on the shift position, braking operation or the like, IGOFF at which main power supply of the vehicle 8 including a drive system is shut off so that the vehicle 8 cannot run, and the like. The pressing operation for IGON corresponds to an ON operation, and the pressing operation for IGOFF corresponds to an OFF operation. The EOP rotation speed Nop is a parameter indicative of a rotation state of the electric oil pump 80. For the power switch 108, other switches such as a lever switch and a rotary switch may be employed. Alternatively, only the ON operation for IGON may be performed with the power switch 108, and the OFF operation for IGOFF may be performed with another switch. Information on the electric power supply state such as IGON and IGOFF may be supplied from another electronic control device etc.

Figure 7:
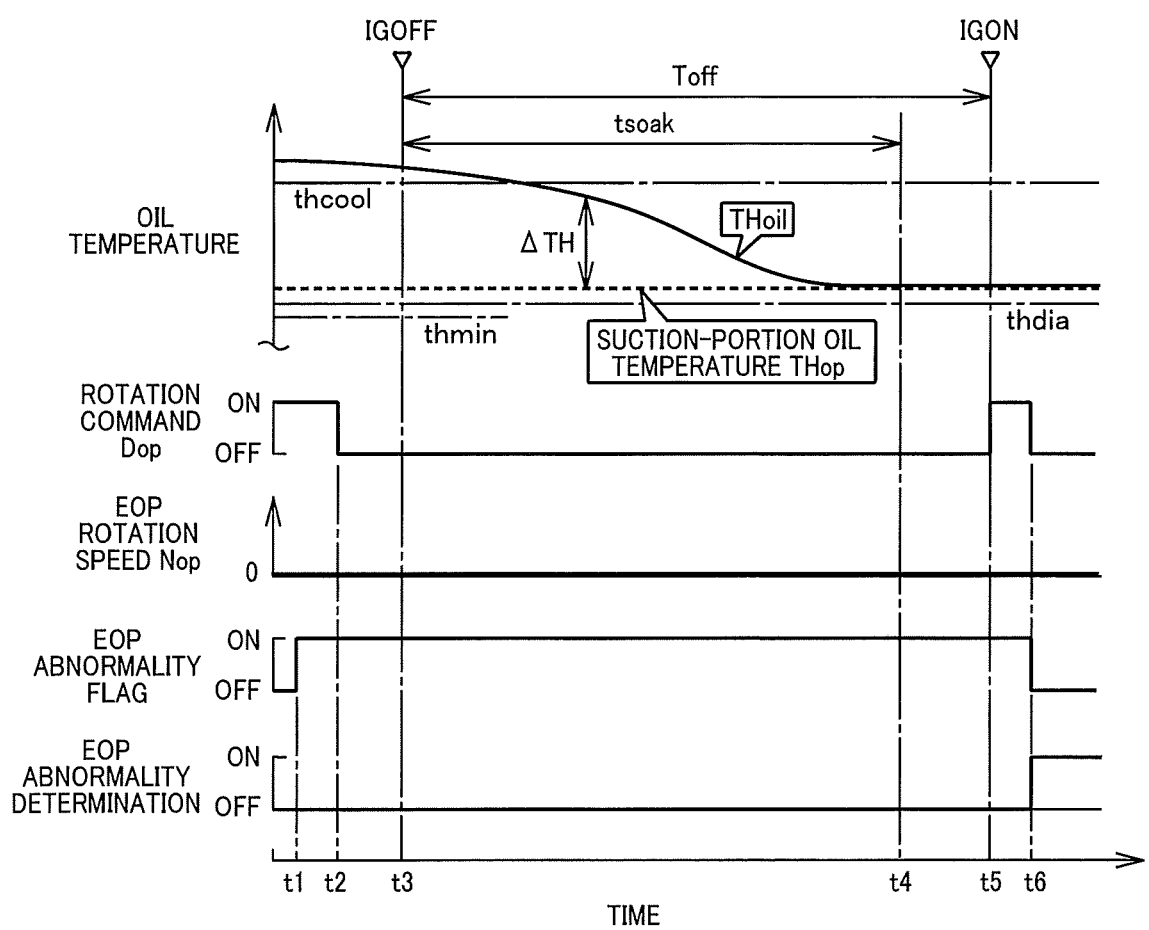
FIG. 7 is an example of a time chart showing changes of portions when an abnormality determination of an electric oil pump (EOP) is made in accordance with the flowcharts of FIGS. 5 and 6.
Figure 8:
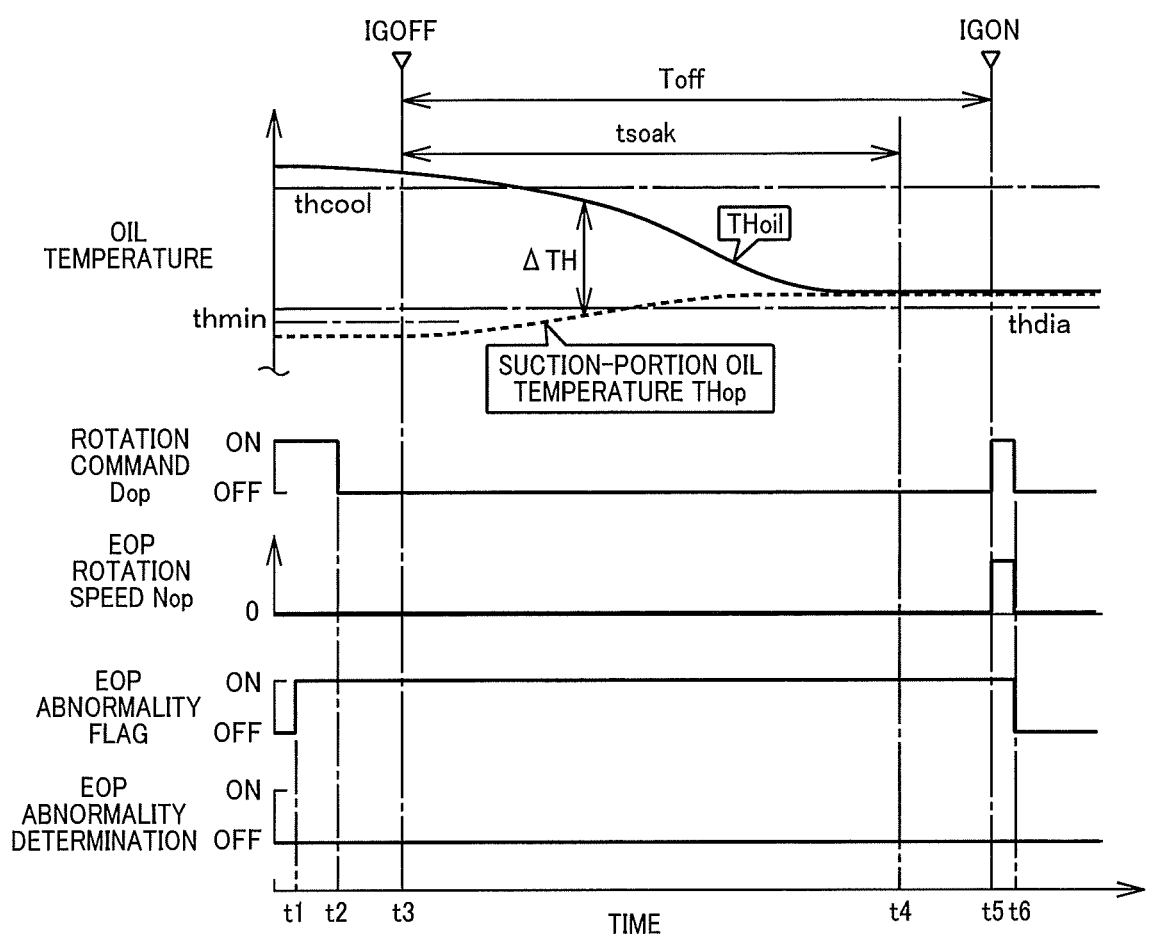
FIG. 8 is an example of a time chart showing changes of portions when the electric oil pump (EOP) is subjected to a determination process of the abnormality in accordance with the flowcharts of FIGS. 5 and 6 and finally determined as having no abnormality.

The electronic control device 100 functionally includes a cooling control portion 102 and a pump abnormality determination portion 104. The cooling control portion 102 outputs a rotation command Dop to the electric oil pump 80 for rotational drive so as to cool the cooling target, i.e., the electric motor 12, and makes a provisional abnormality determination for turning on an EOP abnormality flag in the case of rotation abnormality of the electric oil pump 80, and performs signal processes in accordance with steps S1 to S19 (hereinafter simply referred to as S1 to S19) of a flowchart of FIG. 5. The pump abnormality determination portion 104 determines whether the electric oil pump 80 is abnormal when the cooling control portion 102 makes the provisional abnormality determination and performs signal processes in accordance with steps C1 to C11 (hereinafter simply referred to as C1 to C11) of a flowchart of FIG. 6. FIGS. 7 and 8 are examples of time charts showing changes in operation states of the portions when the signal processes are performed in accordance with the flowcharts of FIGS. 5 and 6.

Figure 5:
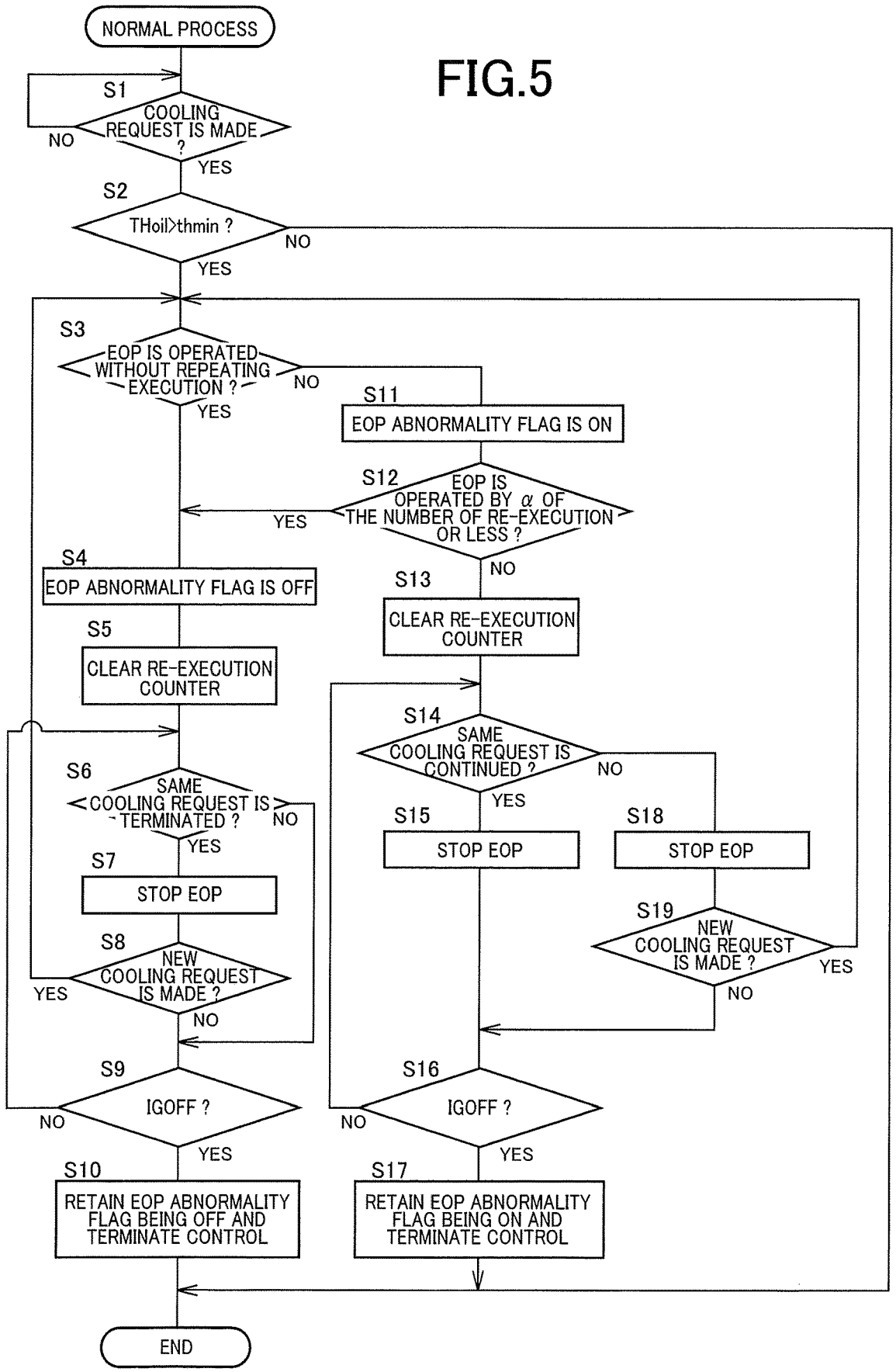
FIG. 5 is a flowchart for specifically explaining a signal process performed by a cooling control portion of FIG. 2.

FIG. 5 is a flowchart for explaining a normal process, i.e., normal cooling control, performed by the cooling control portion 102 to cool the electric motor 12 as necessary, and at S1, it is determined whether a cooling request is made. Whether the cooling request is made is determined by determining whether a predefined cooling request condition is affirmed, and specifically, if at least one of the oil temperature detection value THoil and the motor temperature detection value THmg is higher than a predefined cooling-required temperature thcool, the cooling request condition is affirmed, and it is determined that the cooling request is made. The cooling-required temperature thcool is set to, for example, a temperature of about 80° C. to 120° C. for the prevention of overheat and the efficient operation of the electric motor 12. If this cooling request condition is affirmed, S2 is executed, and it is determined whether the oil temperature detection value THoil is higher than an operation allowable temperature THoil>thmin. Specifically, if the oil temperature of the cooling oil circulated by the electric oil pump 80 is relatively low, increased viscous resistance of the cooling oil increases the load of the electric oil pump 80, which makes rotation of the electric oil pump 80 impossible or causes overheating of the electric oil pump 80, and therefore, a lower limit value of the oil temperature allowing the electric oil pump 80 to properly operate is determined as the operation allowable temperature thmin. The operation allowable temperature thmin is set to, for example, about −10° C. to +5° C. in accordance with temperature characteristics of viscosity of the cooling oil. In the case of THoil<thmin, the electric oil pump 80 cannot properly be operated, so that the process is terminated, and in the case of THoil>thmin, the normal process of S3 and subsequent steps is performed. In an initial state (leftmost position) of both the time charts of FIGS. 7 and 8, the oil temperature detection value THoil is higher than the cooling-required temperature thcool, and the determinations of S1 and S2 are both YES (affirmative, the same applies to subsequent determination steps), so that the normal process of S3 and subsequent steps is performed.

At S3, the rotation command Dop is output to the electric oil pump 80, and it is determined whether the rotation speed of the electric oil pump 80, i.e., the EOP rotation speed Nop, has reached a predetermined rotation determination value Nops or more in accordance with the rotation command Dop. If an oil temperature (suction-portion oil temperature) THop of the cooling oil in the oil sump 82, i.e., a suction part of the electric oil pump 80, is substantially the same as the oil temperature detection value THoil of the oil temperature sensor 92, the electric oil pump 80 is rotationally driven at the rotation speed Nop equal to or greater than the rotation determination value Nops normally without repeating execution, so that the determination of S3 is YES, and S4 and subsequent steps are executed. The rotation determination value Nops is set to, for example, a low rotation speed sufficiently lower than the normal EOP rotation speed Nop. When the electric oil pump 80 is properly rotated in accordance with the output of the rotation command Dop, the cooling oil in the oil sump 82 is output to the oil circulation circuit 72, cooled by the oil cooler 84, and supplied to the electric motor 12 etc.

On the other hand, if the electric oil pump 80 is malfunctioning, or if a difference ΔTH between the suction-portion oil temperature THop and the oil temperature detection value THoil is relatively large and the suction-portion oil temperature THop is equal to or less than the operation allowable temperature thmin, the EOP rotation speed Nop may be lower than the rotation determination value Nops, or the pump 80 may be unable to rotate. In this case, the determination of S3 is NO, and S11 and subsequent steps are executed. In this example, the oil sump 82 is the oil suction part of the electric oil pump 80 and is separated from the oil temperature sensor 92, and the oil temperature sensor 92 is disposed near the electric motor 12 and may have a relatively high temperature due to heat conduction or radiant heat, so that if a long stop time of the electric oil pump 80 prolongs a stagnation time of the cooling oil, the difference ΔTH may increase between the oil temperature detection value THoil and the suction-portion oil temperature THop.

At S11, the EOP abnormality flag is turned ON, and at S12, the rotation command Dop is output again to the electric oil pump 80, and the determination as to whether the EOP rotation speed Nop is equal to or greater than the rotation determination value Nops is re-executed. This re-execution is performed multiple times, and when the number of re-execution is equal to or less than a provisional abnormality determination value α and Nop>Nops is satisfied, S4 is executed, and the EOP abnormality flag is turned OFF. At S4 following S3, when the EOP abnormality flag is OFF, the EOP abnormality flag is maintained to be OFF. If the EOP rotation speed Nop is not equal to or greater than the rotation determination value Nops even though the number of re-execution reaches the provisional abnormality determination value a at S12, S13 and subsequent steps are executed while the EOP abnormality flag is maintained to be ON. The provisional abnormality determination value a is appropriately determined by experiments etc. in consideration of durability, heat resistance, etc. of the electric oil pump 80 and is set to a value of about 5 to 10, for example. S12 may be omitted and thus if the determination of S3 is NO (negative, the same applies to subsequent determination steps), S13 and subsequent steps may be executed after S11 without re-executing the determination of S3.

When the EOP abnormality flag is turned OFF at S4, S5 is then executed, and a re-execution counter counting the number of re-execution at S12 is cleared to zero. At next S6, it is determined whether the same cooling request as that in S1 is terminated, i.e., whether the oil temperature detection value THoil and the motor temperature detection value THmg are both equal to or less than the cooling-required temperature thcool so that the cooling request condition is no longer affirmed. While the same cooling request is continuing, the rotational drive of the electric oil pump 80 due to the output of the rotation command Dop is continued to maintain the supply of the cooling oil to the oil circulation circuit 72, it is determined whether IGOFF is achieved by an operation of the power switch 108 at S9, and S6 and subsequent steps are repeatedly executed until IGOFF is achieved. If the same cooling request is terminated and the determination of S6 is YES, the output of the rotation command Dop is stopped at S7 to stop the electric oil pump 80, and S8 is then executed to determine whether a new cooling request is made as in S1. If a new cooling request is made, S3 and subsequent steps are executed, and if no new cooling request is made, S9 is executed. When IGOFF is achieved by an operation of the power switch 108 and the determination of S9 is YES, S10 is executed to retain the EOP abnormality flag being OFF, and the normal process is terminated.

At S13 executed if the determination of S12 is NO, i.e., if the EOP rotation speed Nop is not equal to or greater than the rotation determination value Nops even though the number of re-execution reaches the provisional abnormality determination value α, the re-execution counter counting the number of re-execution at S12 is cleared to zero. At subsequent S14, it is determined whether the same cooling request is continued, i.e., whether at least one of the oil temperature detection value THoil and the motor temperature detection value THmg is higher than the cooling-required temperature thcool so that the cooling request condition is still affirmed. While the same cooling request is continuing, the output of the rotation command Dop is stopped at S15 to stop the electric oil pump 80; it is determined at S16 whether IGOFF is achieved as in S9; if IGOFF is not achieved, S14 and subsequent steps are repeatedly executed; and if IGOFF is achieved, S17 is executed. If the same cooling request is terminated and the determination of S14 is NO, the output of the rotation command Dop is stopped at S18 to stop the electric oil pump 80, and S19 is then executed to determine whether a new cooling request is made as in S1. If a new cooling request is made, S3 and subsequent steps are executed, and if no new cooling request is made, S16 is executed. When IGOFF is achieved by an operation of the power switch 108 and the determination of S16 is YES, S17 is executed to retain the EOP abnormality flag being ON, i.e., the state of the provisional abnormality determination, and the normal process is terminated.

In the time chart of FIG. 7, while the suction-portion oil temperature THop of the oil sump 82 is higher than the operation allowable temperature thmin, the EOP rotation speed Nop is substantially zero and lower than the rotation determination value Nops regardless of the rotation command Dop, so that the determination of S3 is NO and S11 is executed, and the EOP abnormality flag is turned ON at time t1. In FIG. 7, the EOP rotation speed Nop is substantially zero regardless of the re-execution of S12, and the electric oil pump 80 is stopped at time t2 due to execution of S15, and IGOFF is achieved at time t3. Although the output (ON) and the stop of output (OFF) of the rotation command Dop are repeated multiple times, the rotation command Dop seems to be a continuous output in FIG. 7 because of narrow intervals. The same applies to FIG. 8. At this stage, an EOP abnormality determination corresponding to a definite determination of abnormality of the electric oil pump 80 is still OFF. Specifically, since the actual suction-portion oil temperature THop is higher than the operation allowable temperature thmin, the electric oil pump 80 is considered abnormal; however, the suction-portion oil temperature THop is not measured, so that the abnormality determination of the electric oil pump 80 cannot be made.

On the other hand, the time chart of FIG. 8 shows the case that the suction-portion oil temperature THop of the oil sump 82 is lower than the operation allowable temperature thmin, and the EOP rotation speed Nop is substantially zero and lower than the rotation determination value Nops regardless of the rotation command Dop, so that the determination of S3 is NO and S11 is executed, and the EOP abnormality flag is turned ON at time t1. Regardless of the re-execution of S12, the EOP rotation speed Nop is substantially zero, and the electric oil pump 80 is stopped at time t2 due to execution of S15, and IGOFF is achieved at time t3. At this stage, the EOP abnormality determination corresponding to a definite determination of abnormality of the electric oil pump 80 is still OFF. In this case, since the actual suction-portion oil temperature THop is lower than the operation allowable temperature thmin, whether the electric oil pump 80 is abnormal cannot be determined even if the suction-portion oil temperature THop is measured.

Figure 6:
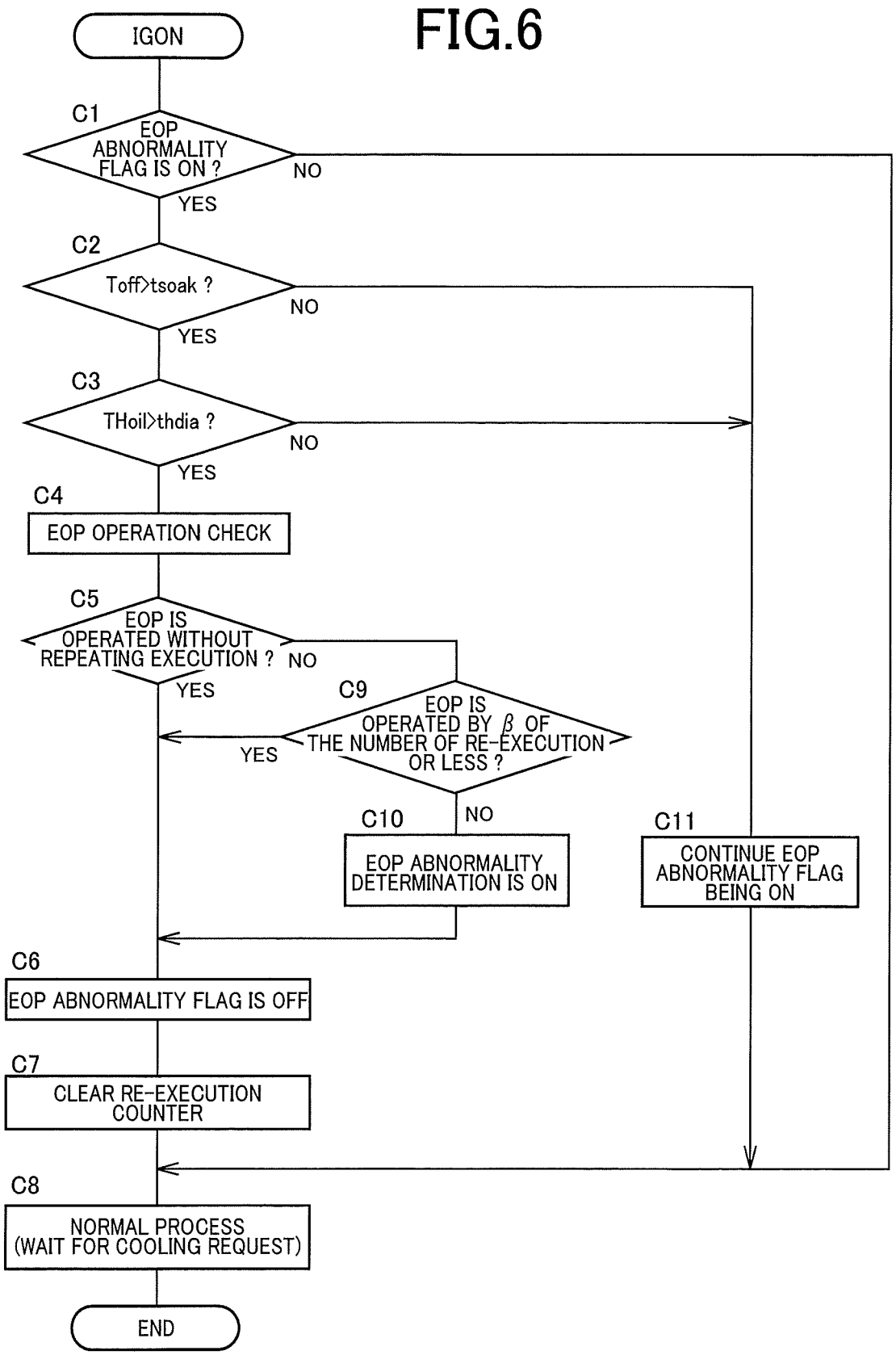
FIG. 6 is a flowchart for specifically explaining a signal process performed by a pump abnormality determination portion of FIG. 2.

The flowchart of FIG. 6 is executed by the pump abnormality determination portion 104 when IGON is achieved by the operation of the power switch 108, i.e., immediately after an operation of the electric vehicle 8 to run in accordance with an accelerator operation etc. At C1 of FIG. 6, it is determined whether the EOP abnormality flag is ON, and if the EOP abnormality flag is ON, the abnormality determination process of C2 and subsequent steps is executed, and if the EOP abnormality flag is OFF, C8 is executed to execute the normal process of FIG. 5 performed by the cooling control portion 102.

At C2, it is determined whether an IGOFF time Toff, i.e., a duration of IGOFF, is longer than a predefined soak time tsoak. The electronic control device 100 includes a timer or a counter measuring the IGOFF time Toff. The IGOFF time Toff corresponds to the operation stop time of the present invention, and the soak time tsoak corresponds to the determination permission time of the present invention. The soak time tsoak is a time required for the difference ΔTH between the suction-portion oil temperature THop and the oil temperature detection value THoil to decrease due to heat dissipation, etc. of the cooling target, i.e., the electric motor 12, and the cooling oil to a level at which the abnormality of the electric oil pump 80 can properly be determined, and is appropriately determined in advance by experiments etc. In this example, the soak time tsoak is set to, for example, about 3 to 8 hours in consideration of a general vehicle stop time in a normal usage form of the electric vehicle 8. In the case of Toff>tsoak, C3 and subsequent steps are executed, and in the case of Toff<tsoak, the abnormality determination may not properly be made, so that the EOP abnormality flag being ON is continued at C11 without performing the further abnormality determination process, then the normal process at C8 is executed.

At C3, it is determined whether the oil temperature detection value THoil is higher than a predefined determination permission temperature thdia. Since C3 is executed immediately after Toff≤tsoak is satisfied and IGON is achieved, i.e., immediately after the start of operation, the oil temperature detection value THoil in this case substantially coincides with the suction-portion oil temperature THop of the oil sump 82. The determination permission temperature thdia is a temperature at which the electric oil pump 80 is properly rotationally driven at the EOP rotation speed Nop equal to or greater than the rotation determination value Nops in accordance with the rotation command Dop, and is set to a temperature equal to or greater than the operation allowable temperature thmin in accordance with the temperature characteristics of viscosity of the cooling oil. In this example, the determination permission temperature thdia is set to a temperature higher by about 5° C. to 10° C. than the operation allowable temperature thmin so that the electric oil pump 80 is reliably rotationally driven. In the case of THoil>thdia, the abnormality determination process of C4 and subsequent steps is executed, and in the case of THoil<thdia, the abnormality determination may not properly be made, so that the EOP abnormality flag being ON is continued at C11 without performing the further abnormality determination process, then the normal process at C8 is executed.

At C4, the rotation command Dop is output to perform an operation check for whether the electric oil pump 80 is properly rotationally driven at an EOP rotation speed Nop equal to or greater than the rotation determination value Nops. The rotation command Dop and the rotation determination value Nops may be the same as the rotation command Dop and the rotation determination value Nops of S3 of the normal process or may have different magnitudes. If the electric oil pump 80 does not properly rotate, this operation check is re-executed until the number of re-execution is equal to a predefined abnormality determination value β. The abnormality determination value β may be the same as the provisional abnormality determination value α or can be set to a larger value so as to increase the accuracy of abnormality determination. When the operation check is completed, the output of the rotation command Dop is stopped to stop the electric oil pump 80. At C5, it is determined whether the electric oil pump 80 can properly rotationally be driven without re-executing the operation check, and if no re-execution is performed, C6 is immediately executed to turn off the EOP abnormality flag, and the re-execution counter is then cleared to zero at C7, then the normal process at C8 is executed. When the re-execution is performed, it is determined at C9 whether the electric oil pump 80 can properly rotationally be driven performing the re-execution before the abnormality determination value β, and if the electric oil pump 80 can rotationally be driven, C6 and subsequent steps are executed. If the electric oil pump 80 cannot properly be rotated by performing the re-execution to the abnormality determination value β, the EOP abnormality determination is turned on at C10, and C6 and subsequent steps are then executed. Since the EOP abnormality determination is turned ON at C10, the electric oil pump 80 is definitely determined as being abnormal. The operation check of C4 may be performed at C5 and C10.

FIGS. 7 and 8 show a case where the IGOFF time Toff has exceeded time t4 that is the soak time tsoak and the oil temperature detection value THoil is higher than the determination permission temperature thdia when IGON is achieved by the power switch 108, so that at time t5 when the IGON is achieved, the EOP operation check of C4 is started and the rotation command Dop is output. FIG. 7 shows the case that the electric oil pump 80 cannot rotationally be driven by performing the re-execution to the abnormality determination value β, and the EOP abnormality determination is turned ON at time t6 when C10 is executed, and the electric oil pump 80 is definitely determined as being abnormal. FIG. 8 shows the case that the electric oil pump 80 can properly be rotated by performing the re-execution to the abnormality determination value 13, and C6 and subsequent steps are executed without executing C10, so that the EOP abnormality flag is turned OFF at time t6. Therefore, the time chart of FIG. 8 shows a case where the difference ΔTH between the suction-portion oil temperature THop and the oil temperature detection value THoil is large, and the suction-portion oil temperature THop of the oil sump 82 is lower than the operation allowable temperature thmin so that the electric oil pump 80 cannot rotate, and the provisional abnormality determination i.e., the EOP abnormality flag being ON is made when the normal process of FIG. 5 is performed by the cooling control portion 102; however, since the abnormality determination process is performed in accordance with FIG. 6 at the start of operation when IGON is achieved after elapse of the soak time tsoak in which the difference ΔTH decreases between the suction-portion oil temperature THop and the oil temperature detection value THoil, the absence of abnormality is definitely determined.

As described above, in the cooling system 70 of the electric vehicle 8 of this example, at the time of the IGON operation (time t5), if the IGOFF time Toff defined as the duration of IGOFF is longer than the soak time tsoak that is the determination permission time, and the oil temperature detection value THoil is higher than the determination permission temperature thdia, the rotation command Dop is output to the electric oil pump 80 so as to determine the presence/absence of the abnormality of the electric oil pump 80, and therefore, the abnormality determination of the electric oil pump 80 can be made with high accuracy. Specifically, since the oil temperature sensor 92 is disposed near the electric motor 12 that is the cooling target, if a long stop time of the electric oil pump 80 prolongs a stagnation time of the cooling oil during the normal process before time t3 when the cooling control is provided as necessary during running etc., the difference ΔTH increases between the oil temperature detection value THoil and the suction-portion oil temperature THop due to a thermal effect of the electric motor 12, and the electric oil pump 80 does not properly operate even though the rotation command Dop is output based on the oil temperature detection value THoil, so that an erroneous abnormality determination may be made. In this regard, since the difference ΔTH decreases due to heat dissipation etc. as the IGOFF time Toff elapses, the erroneous abnormality determination attributable to the difference ΔTH between the suction-portion oil temperature THop and the oil temperature detection value THoil can be prevented by appropriately setting the soak time tsoak. As compared to when a dedicated temperature sensor is separately disposed in the oil suction part of the electric oil pump 80, i.e., in the oil sump 82, the accuracy and reliability of abnormality determination can easily and inexpensively be improved without increasing the number of parts.

When the rotation command Dop is output to the electric oil pump 80 in the normal cooling control by the cooling control portion 102, and the electric oil pump 80 has a rotation abnormality, for example, the electric oil pump 80 cannot be rotated, the provisional abnormality determination is made so that the EOP abnormality flag is turned ON, and when the EOP abnormality flag is ON, the pump abnormality determination portion 104 executes C2 and subsequent steps of FIG. 6 to perform the process of determining the presence/absence of abnormality. This reduces a frequency of execution of the abnormality determination process by the pump abnormality determination portion 104, so that deterioration in NV and electric power consumption due to rotation of the electric oil pump 80 is suppressed. In this example, since the abnormality determination process is performed immediately after the start of operation when the IGON operation is performed, NV caused by the rotation of the electric oil pump 80 during stop of the vehicle 8 may give a sense of strangeness to the driver; however, since the frequency of execution of the abnormality determination process by the pump abnormality determination portion 104 is reduced, the sense of strangeness given to the driver can be reduced.

The cooling control portion 102 executes the cooling control of S3 and subsequent steps of FIG. 5 and outputs the rotation command Don to the electric oil pump 80 when the oil temperature detection value THoil is higher than the predefined operation allowable temperature thmin, and therefore, when the difference ΔTH between the suction-portion oil temperature THop and the oil temperature detection value THoil is relatively small, the suction-portion oil temperature THop is higher than the operation allowable temperature thmin so that the electric oil pump 80 is properly operated. Therefore, the frequency of the provisional abnormality determination in which the EOP abnormality flag is ON is reduced during the normal process performed by the cooling control portion 102, and the frequency of execution of the abnormality determination process by the pump abnormality determination portion 104 is further reduced, so that the deterioration in NV and electric power consumption is further properly suppressed.

Although the cooling target is the electric motor 12 and generates heat due to a running load etc. so that it is necessary to supply the cooling oil by the electric oil pump 80 for cooling, the oil temperature sensor 92 is disposed closer to the electric motor 12 than to the oil suction part of the electric oil pump 80, and the cooling request condition is affirmed when at least one of the oil temperature detection value THoil detected by the oil temperature sensor 92 and the motor temperature detection value THmg detected by the motor temperature sensor 94 is higher than the cooling-required temperature thcool, then S3 and subsequent steps of FIG. 5 are executed and the rotation command Dop is output to the electric oil pump 80, so that the electric motor 12 can properly be cooled.

When the oil temperature detection value THoil of the oil temperature sensor 92 is higher than the predefined operation allowable temperature thmin, the cooling control portion 102 executes S3 and subsequent steps of FIG. 5 to output the rotation command Dop to the electric oil pump 80, and therefore, when the difference ΔTH between the suction-portion oil temperature THop and the oil temperature detection value THoil is relatively small, the suction-portion oil temperature THop is higher than the operation allowable temperature thmin, and the electric oil pump 80 is properly operated. However, since the oil temperature sensor 92 is disposed near the electric motor 12, if a long stop time of the electric oil pump 80 prolongs a stagnation time of the cooling oil, the oil temperature detection value THoil of the oil temperature sensor 92 becomes higher due to a thermal effect of radiant heat etc. of the electric motor 12, and the difference ΔTH between the oil temperature detection value THoil and the suction-portion oil temperature THop of the electric oil pump 80 may increase. Therefore, a remarkable effect is obtained in terms of preventing the erroneous abnormality determination attributable to the difference ΔTH between the suction-portion oil temperature THop and the oil temperature detection value THoil by outputting the rotation command Dop to the electric oil pump 80 to perform the process of determining the presence/absence of abnormality when the IGOFF time Toff, i.e., the operation stop time, is longer than the soak time tsoak and the oil temperature detection value THoil is higher than the determination permission temperature thdia.

In the cooling system 70 of this example, the cooling target is the electric motor 12 used as the drive force source for running; the electric drive unit 10 is configured to include the electric motor 12, the transaxle 14, and the casing 16; the casing 16 includes the motor chamber 28 and the gear chamber 26; and the cooling oil returned to the oil sump 82 disposed in the gear chamber 26 is sucked by the electric oil pump 80 and supplied through the oil cooler 84 to the electric motor 12 in the motor chamber 28. In this case, since the oil temperature sensor 92 is disposed on the motor chamber 28 side, if a long stop time of the electric oil pump 80 prolongs a stagnation time of the cooling oil, the oil temperature detection value THoil of the oil temperature sensor 92 becomes higher due to a thermal effect of radiant heat etc. of the electric motor 12, while the oil temperature of the oil sump 82 defined as the oil suction part of the electric oil pump 80, i.e., the suction-portion oil temperature THop, is reduced by an ambient temperature, so that the difference ΔTH therebetween may become larger. Therefore, a remarkable effect is obtained in terms of preventing the erroneous abnormality determination attributable to the difference ΔTH between the suction-portion oil temperature THop and the oil temperature detection value THoil by outputting the rotation command Dop to the electric oil pump 80 to perform the process of determining the presence/absence of abnormality when the IGOFF time Toff, i.e., the operation stop time, is longer than the soak time tsoak and the oil temperature detection value THoil is higher than the determination permission temperature thdia.

Although the example of the present invention has been described in detail with reference to the drawings, this is merely an embodiment, and the present invention can be implemented in variously modified and improved forms based on the knowledge of those skilled in the art.

REFERENCE SIGNS LIST

8: electric vehicle (vehicle) 10: electric drive unit 12: electric motor (cooling target, rotating machine) 14: transaxle 16: casing 17r: rear wheels (wheels) 26: gear chamber 28: motor chamber 50: differential device 70: cooling system 72: oil circulation circuit 80: electric oil pump 82: oil sump (oil suction part) 84: oil cooler 92: oil temperature sensor 94: motor temperature sensor (rotating-machine temperature sensor) 100: electronic control device (control device) 102: cooling control portion 104: pump abnormality determination portion Dop: rotation command Nop: EOP rotation speed (rotation state) THoil: oil temperature detection value THmg: motor temperature detection value (rotating-machine temperature detection value) THop: suction-part oil temperature ΔTH: difference between THop and THoil thcool: cooling-required temperature thmin: operation allowable temperature thdia: determination permission temperature Toff: IGOFF time (operation stop time) tsoak: soak time (determination permission time)

What is claimed is:

1. A vehicle cooling system comprising:
   an oil circulation circuit in which a cooling oil is circulated by an electric oil pump to cool a predetermined cooling target with the cooling oil;
   an oil temperature sensor detecting an oil temperature that is a temperature of the cooling oil; and
   a control device including a cooling control portion outputting a rotation command for operating the electric oil pump so as to cool the cooling target, wherein
   the control device includes a pump abnormality determination portion outputting the rotation command to the electric oil pump to determine a presence/absence of abnormality based on a rotation state of the electric oil pump when an operation stop time of the vehicle is longer than a predefined determination permission time and an oil temperature detection value detected by the oil temperature sensor is higher than a predefined determination permission temperature.

2. The vehicle cooling system according to claim 1, wherein
   the cooling control portion makes a provisional abnormality determination in case of rotation abnormality of the electric oil pump when the rotation command is output to the electric oil pump, and wherein
   the pump abnormality determination portion performs a process of determining the presence/absence of abnormality when the provisional abnormality determination is made by the cooling control portion.

3. The vehicle cooling system according to claim 2, wherein the cooling control portion outputs the rotation command to the electric oil pump when the oil temperature detection value is higher than a predefined operation allowable temperature.

4. The vehicle cooling system according to claim 3, wherein
the cooling target is an electric motor used as a drive force source for running, wherein
an electric drive unit is configured to include the electric motor, a transaxle transmitting an output of the electric motor via a differential device to left and right wheels, and a casing housing the electric motor and the transaxle, wherein
the casing includes a motor chamber housing the electric motor and a gear chamber housing the transaxle, wherein
the electric oil pump sucks the cooling oil returned to an oil sump disposed in the gear chamber to supply the cooling oil through an oil cooler to the electric motor in the motor chamber, and wherein
the oil temperature sensor is disposed on the motor chamber side.

5. The vehicle cooling system according to claim 2, wherein
the cooling target is a rotating machine, wherein
the oil temperature sensor is disposed closer to the rotating machine than an oil suction part of the electric oil pump, wherein
the vehicle cooling system includes a rotating-machine temperature sensor detecting a rotating-machine temperature that is a temperature of the rotating machine, wherein
the cooling control portion outputs the rotation command to the electric oil pump when a predefined cooling request condition is affirmed and the oil temperature detection value is higher than a predefined operation allowable temperature, and wherein
the cooling request condition is affirmed when at least one of a rotating-machine temperature detection value detected by the rotating-machine temperature sensor and the oil temperature detection value is higher than a predefined cooling-required temperature.

6. The vehicle cooling system according to claim 5, wherein
the cooling target is an electric motor used as a drive force source for running, wherein
an electric drive unit is configured to include the electric motor, a transaxle transmitting an output of the electric motor via a differential device to left and right wheels, and a casing housing the electric motor and the transaxle, wherein
the casing includes a motor chamber housing the electric motor and a gear chamber housing the transaxle, wherein
the electric oil pump sucks the cooling oil returned to an oil sump disposed in the gear chamber to supply the cooling oil through an oil cooler to the electric motor in the motor chamber, and wherein
the oil temperature sensor is disposed on the motor chamber side.

7. The vehicle cooling system according to claim 2, wherein
the cooling target is an electric motor used as a drive force source for running, wherein
an electric drive unit is configured to include the electric motor, a transaxle transmitting an output of the electric motor via a differential device to left and right wheels, and a casing housing the electric motor and the transaxle, wherein
the casing includes a motor chamber housing the electric motor and a gear chamber housing the transaxle, wherein
the electric oil pump sucks the cooling oil returned to an oil sump disposed in the gear chamber to supply the cooling oil through an oil cooler to the electric motor in the motor chamber, and wherein
the oil temperature sensor is disposed on the motor chamber side.

8. The vehicle cooling system according to claim 1, wherein
the cooling control portion outputs the rotation command to the electric oil pump when the oil temperature detection value is higher than a predefined operation allowable temperature.

9. The vehicle cooling system according to claim 8, wherein
the cooling target is an electric motor used as a drive force source for running, wherein
an electric drive unit is configured to include the electric motor, a transaxle transmitting an output of the electric motor via a differential device to left and right wheels, and a casing housing the electric motor and the transaxle, wherein
the casing includes a motor chamber housing the electric motor and a gear chamber housing the transaxle, wherein
the electric oil pump sucks the cooling oil returned to an oil sump disposed in the gear chamber to supply the cooling oil through an oil cooler to the electric motor in the motor chamber, and wherein
the oil temperature sensor is disposed on the motor chamber side.

10. The vehicle cooling system according to claim 1, wherein
the cooling target is a rotating machine, wherein
the oil temperature sensor is disposed closer to the rotating machine than an oil suction part of the electric oil pump, wherein
the vehicle cooling system includes a rotating-machine temperature sensor detecting a rotating-machine temperature that is a temperature of the rotating machine, wherein
the cooling control portion outputs the rotation command to the electric oil pump when a predefined cooling request condition is affirmed and the oil temperature detection value is higher than a predefined operation allowable temperature, and wherein
the cooling request condition is affirmed when at least one of a rotating-machine temperature detection value detected by the rotating-machine temperature sensor and the oil temperature detection value is higher than a predefined cooling-required temperature.

11. The vehicle cooling system according to claim 10, wherein
the cooling target is an electric motor used as a drive force source for running, wherein
an electric drive unit is configured to include the electric motor, a transaxle transmitting an output of the electric motor via a differential device to left and right wheels, and a casing housing the electric motor and the transaxle, wherein the casing includes a motor chamber housing the electric motor and a gear chamber housing the transaxle, wherein the electric oil pump sucks the cooling oil returned to an oil sump disposed in the gear chamber to supply the cooling oil through an oil cooler to the electric motor in the motor chamber, and wherein the oil temperature sensor is disposed on the motor chamber side.

12. The vehicle cooling system according to claim 1, wherein the cooling target is an electric motor used as a drive force source for running, wherein an electric drive unit is configured to include the electric motor, a transaxle transmitting an output of the electric motor via a differential device to left and right wheels, and a casing housing the electric motor and the transaxle, wherein the casing includes a motor chamber housing the electric motor and a gear chamber housing the transaxle, wherein the electric oil pump sucks the cooling oil returned to an oil sump disposed in the gear chamber to supply the cooling oil through an oil cooler to the electric motor in the motor chamber, and wherein the oil temperature sensor is disposed on the motor chamber side.

\* \* \* \* \*